US011169585B2

United States Patent
Zahir et al.

(10) Patent No.: US 11,169,585 B2
(45) Date of Patent: Nov. 9, 2021

(54) DASHBOARD WITH PUSH MODEL FOR RECEIVING SENSOR DATA

(71) Applicant: Apple Inc., Cupertino, CA (US)

(72) Inventors: Achmed R. Zahir, Menlo Park, CA (US); Inder M. Sodhi, Palo Alto, CA (US); John H. Kelm, Belmont, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 16/543,334

(22) Filed: Aug. 16, 2019

(65) Prior Publication Data

US 2021/0048865 A1    Feb. 18, 2021

(51) Int. Cl.
    *G06F 1/28* (2006.01)
    *G06F 9/451* (2018.01)
    *G06F 1/08* (2006.01)

(52) U.S. Cl.
    CPC .............. *G06F 1/28* (2013.01); *G06F 1/08* (2013.01); *G06F 9/451* (2018.02)

(58) Field of Classification Search
    CPC .............. G06F 1/28; G06F 1/08; G06F 9/451
    See application file for complete search history.

(56) References Cited

U.S. PATENT DOCUMENTS

| 7,623,028 B2 | 11/2009 | Kates |
| 8,984,313 B2 | 3/2015 | Bhandaru et al. |
| 9,377,839 B2 | 6/2016 | Sasidharan et al. |
| 9,412,138 B2 | 8/2016 | Foslien |
| 2008/0272836 A1* | 11/2008 | Smit ............... G06F 1/3259 327/544 |
| 2013/0332108 A1* | 12/2013 | Patel ............... G01C 22/006 702/160 |
| 2014/0059365 A1* | 2/2014 | Heo ............... G06F 1/3209 713/320 |
| 2015/0301581 A1 | 10/2015 | Ding et al. |
| 2017/0047745 A1 | 2/2017 | Chambon |
| 2018/0113498 A1 | 4/2018 | Cronin et al. |
| 2019/0020433 A1* | 1/2019 | Pitigoi-Aron ......... G06F 1/12 |
| 2019/0306796 A1* | 10/2019 | Yagi ............... H04W 52/02 |

OTHER PUBLICATIONS

International Search Report and Written Opinion in International Application No. PCT/US2020/046397, dated Nov. 10, 2020, 12 pages.

\* cited by examiner

*Primary Examiner* — Nimesh G Patel
(74) *Attorney, Agent, or Firm* — Rory D. Rankin; Kowert, Hood, Munyon, Rankin & Goetzel, P.C

(57) ABSTRACT

Systems, methods and mechanisms for efficiently reporting sensor data of multiple processing units. In various embodiments, a computing system includes processing units and a power management unit. The processing units include multiple sensors for measuring a variety of types of sensor data. If the sensor values exceed corresponding thresholds, then a processing unit sends the sensor values to the power management unit. Logic in the power management unit stores received sensor values. When the logic determines behavior of a processing unit changes, the logic updates one or more sensor thresholds for the processing unit for changing a frequency of reporting one or more sensor values of the processing unit. The logic sends the updated one or more sensor thresholds to the processing unit. The logic updates more operating modes and operating states for the processing units based on the received sensor values.

20 Claims, 8 Drawing Sheets

Dashboard Entry 300

| Source Identifier 302 | Source Thermal Limit 304 | Sensor Identifier 310A | Sensor Entry Status 312A | Time Stamp 314A | Sensor Value 316A | . . . | Sensor Identifier 310B | Sensor Entry Status 312B | Time Stamp 314B | Sensor Value 316B |

FIG. 3

DASHBOARD WITH PUSH MODEL FOR RECEIVING SENSOR DATA

BACKGROUND

Technical Field

Embodiments described herein relate to the field of computing systems and, more particularly, to efficiently reporting sensor data of multiple processing units.

Description of the Related Art

A computing system such as a semiconductor chip includes multiple functional blocks or units, each capable of processing data. In various embodiments, the multiple functional units are individual dies on one of a system on a chip (SOC), a multi-chip module (MCM) or a printed circuit board. Examples of functional units are general-purpose processors with one or more cores in a central processing unit (CPU), highly parallel data architected processors with one or more cores in graphics processing units (GPUs) and digital signal processors (DSPs), display controllers, audio processing components, a camera processing unit, networking components, peripheral interface controllers, memory controllers, and so on.

Control logic, such as a power management unit, within the computing system determines one or more operating states for the different functional units. The operating state includes one or more of a power supply voltage and an operational clock frequency. Clock generating circuitry generates different clock signals at the one or more specified different frequencies, whereas a power distribution network provides the one or more specified different power supply voltages. In addition, the power management unit determines one or more operating modes for the different functional units. The operating modes include a sleep mode where one or more blocks of logic are powered off, an idle mode where one or more blocks of logic have clock enable signals disabled, and one or more active modes, each with a different operating state.

To determine the operating states and the operating modes of the different functional units, logic implemented by hardware and/or software in the power management unit periodically samples metric data from the different functional units. Multiple sensors monitor the metric data, so the metric data is also referred to as sensor data. Examples of the sensor data are sensor temperature, sensor voltage, an average of a number of executed instructions per clock cycle, an average of a number of accesses of a particular data storage, a number of misses of a particular data storage, a measure of energy consumption such as an amount of Joules or a number of energy credits, a total number or a rate of a variety of other events, and so forth. The sensor data is often specific to the type of the functional unit.

Typically, the communication between the functional units and the power management unit utilizes a communication fabric. The periodic sampling of the sensor data uses read transactions, which are non-posted transactions. Therefore, the periodic sampling of the sensor data uses two transactions for each type of sensor data and for each functional unit, which increases the amount of data transferred in the communication fabric. The periodic sampling of the sensor data is also capable of waking up an idle or asleep functional unit for merely reporting the requested sensor data. In many cases, the received sensor data does not indicate any further processing is necessary, so the value of obtaining the sensor data is reduced while the cost remains.

In view of the above, efficient systems, methods and mechanisms for reporting sensor data of multiple processing units are desired.

SUMMARY

Systems, methods and mechanisms for efficiently reporting sensor data of multiple processing units are contemplated. In various embodiments, a computing system includes one or more processing units and a power management unit. The processing units process instructions of one or more software applications. The processing units are agents or endpoints in the computing system. The processing units are also sources of sensor data. The power management unit generates and sends one or more updated operating modes and operating states to the sources. The operating states are also referred to as power-performance states (p-states). Each of the operating states includes one or more of a power supply voltage and an operational clock frequency. Each of the operating modes includes a sleep mode where one or more blocks of logic in the processor are powered off, an idle mode where one or more blocks of logic have clock enable signals disabled, and one or more active modes, each with a different operating state.

Each of the sources includes multiple sensors for measuring a variety of types of data. Examples of the types of sensors are on-die temperature sensors, on-die current sensors, on-die voltage sensors and performance counters. Examples of the sensor data are on-die temperature, on-die supply voltage, on-die current draw, an average of a number of executed instructions per clock cycle, an average of a number of accesses of a particular data storage, a number of misses of a particular data storage, a measure of energy consumption such as an amount of Joules or a number of energy credits, a total number or a rate of a variety of other events, and so forth. The sensor data is often specific to the type of the functional block within a source. To determine the operating states and the operating modes of the functional blocks within a source, logic implemented by hardware and/or software in the power management unit uses the sensor data from the processing units.

Rather than the power management unit sends periodic requests to the processing units to sample the sensor data, in various embodiments, the power management unit sends no requests. Instead, each of the processing units uses one or more qualifying reporters corresponding to a respective one of the sensors for determining when to send sensor data to the power management unit. Each of the qualifying reporters includes filtering logic for determining whether to send the data measured by a corresponding sensor to the power management unit. In an embodiment, the filtering logic compares a value of a corresponding sensor to a threshold associated with the sensor. If the value of the sensor exceeds the threshold, then the filtering logic sends the value of the sensor to the power management unit. However, if the value of the sensor does not exceed the threshold, then the filtering logic prevents sending the value of the sensor to the power management unit.

In some embodiments, the filtering logic performs the comparisons during each sampling interval. In an embodiment, one or more of the sensors sample data using different sampling intervals. Therefore, the filtering logic of one or more qualifying reporters perform the comparisons using different sampling intervals. In one embodiment, one or more of the qualifying reporters use filtering logic for comparing sensor data to an absolute threshold. For example, a given qualifying reporter compares a sampled temperature on a particular location of the processor to an absolute value of a temperature threshold such as 50 degrees Celsius. In another embodiment, one or more of the qualifying reporters use filtering logic for comparing sensor data to a relative threshold. For example, a given qualifying reporter compares a difference of a sampled temperature on a particular location of the processor to a previously sampled temperature of the same location to a relative value of the temperature threshold such as an increase of 20 degrees Celsius and/or a decrease of 15 degrees Celsius.

In some embodiments, one or more of the qualifying reporters use filtering logic for comparing sensor data to a rate threshold. For example, a given qualifying reporter compares a difference of a sampled value, such as temperature, on a particular location of the processor to a previously sampled value per change in time. In one example, the rate threshold is an increase of 20 degrees Celsius per 15 minutes. Therefore, in various embodiments, the filtering logic determines rates or other ratios before performing comparisons to thresholds. In one embodiment, the filtering logic determines a rate of a number of cache misses in one or more levels of a cache memory hierarchy before comparing the rate to a rate threshold. In some embodiments, logic in the qualifying reporters or an interface of the processor groups a qualified sensor value with any other sensor values qualified for reporting. Following this, the logic sends the sensor value and any other qualified sensor values to the power management unit.

The power management unit includes data storage with multiple entries for storing the received sensor values. The data storage is also referred to as a dashboard. Each entry of the dashboard stores one or more sensor values. When the power management unit receives one or more qualified sensor values, in an embodiment, logic in the power management unit generates an indication of age of the received one or more qualified sensor values. In one embodiment, the power management unit samples or captures a recording timestamp locally. The logic also identifies a source that sent the qualified sensor value. In one example, the logic analyzes a received packet and determines the processing unit that sent the packet. In addition, the logic identifies an entry in the dashboard based on the identified source. In one embodiment, the dashboard entries are assigned among the processing units and the logic maintains a given offset for each of the processing units. The logic determines a combination of a start address and the offset points to the identified dashboard entry. In an embodiment, the logic stores each of the indication of age and the sensor value in the identified dashboard entry.

In various embodiments, when the logic in the power management unit determines behavior of the identified source is changing, the logic updates one or more sensor thresholds for the identified source for changing a frequency of reporting one or more sensor values of the identified source. The power management unit sends the updated one or more sensor thresholds to the identified source. In some embodiments, the power management unit does not maintain an age threshold, so when the logic in the power management unit determines a time to process content stored in an identified dashboard entry is reached, the logic updates one or more operating modes and operating states for one or more processing units based on the sensor value of the identified dashboard entry. In other embodiments, the power management unit does maintain an age threshold such as a timestamp threshold. When the logic in the power management unit determines a time to process content stored in the identified dashboard entry is reached, in one embodiment, the logic discards the sensor value, responsive to determining the stored indication of age in the identified dashboard entry exceeds an age threshold such as a timestamp threshold. For example, the power management unit has not yet received a more recent sensor value to overwrite the current sensor value in the identified dashboard entry, and the corresponding age of the current sensor value exceeds the age threshold. However, in an embodiment, the logic updates one or more operating modes and operating states for one or more processing units based on the sensor value, responsive to determining the stored indication of age does not exceed the age threshold.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which:

FIG. 3 is a block diagram of one embodiment of a dashboard entry storing sensor data.

Figure 1:
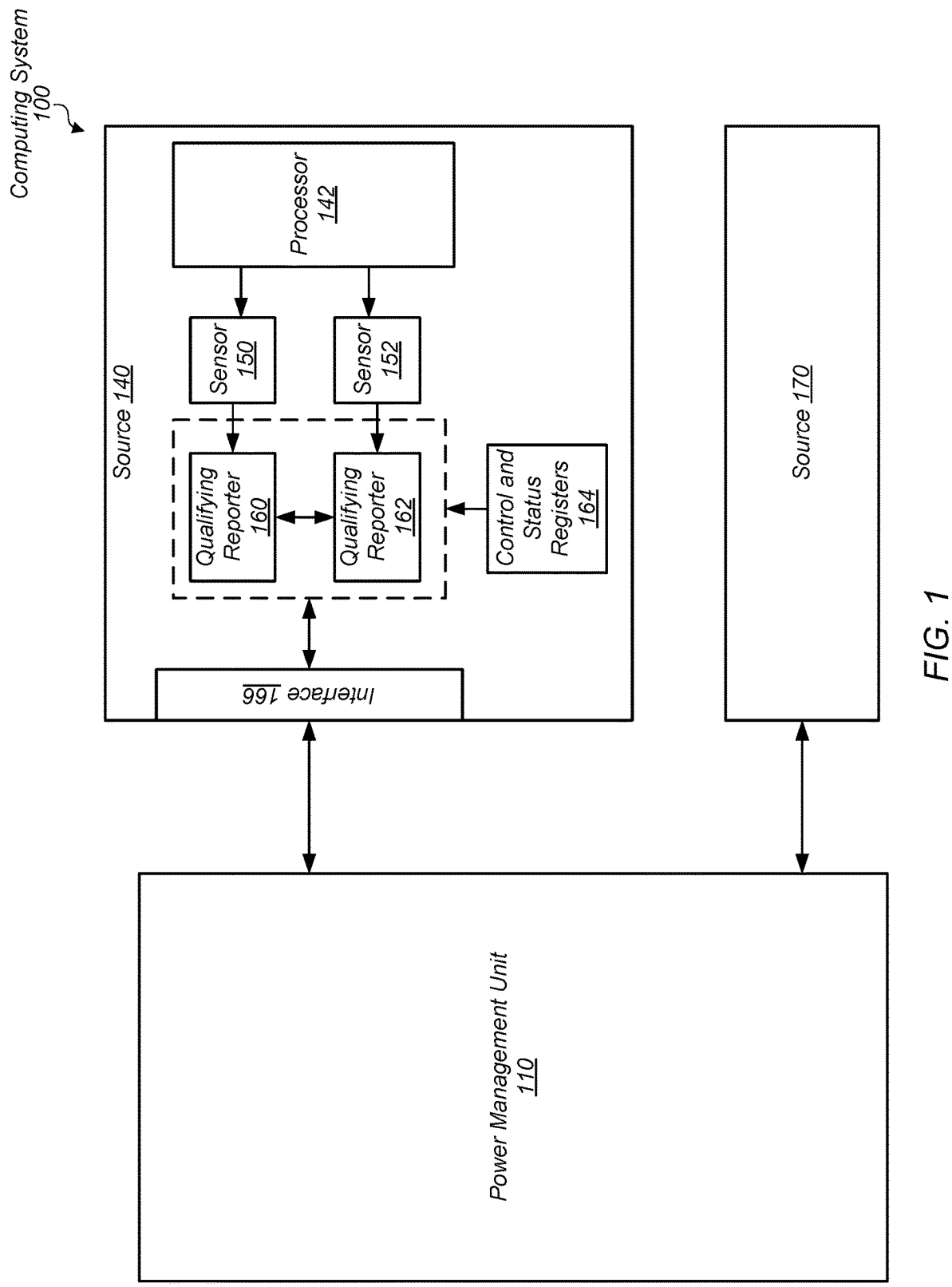
FIG. 1 is a block diagram of one embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a computing system 100 is shown. In the illustrated embodiment, a power management unit 110 transfers information between multiple components such as sources 140 and 170. The source 140 uses a processor 142. The sensors 150 and 152 monitor or otherwise measure data corresponding to the processor 142. The qualifying reporters 160 and 162 are logic implemented by hardware and/or software for determining whether to send sensor data from the sensors 150 and 152 to the power management unit 110 via the interface 166. The qualifying reporters 160 and 162 read threshold values from the programmable control and status registers 164.

The power management unit 110 receives qualified sensor data and stores the received sensor data. The power management unit 110 processes the received sensor data, and based on this processing, the power management unit 110 updates one or more of operating modes and operating states of the sources 140 and 170. The operating states are also referred to as power-performance states (p-states). Each of the operating states includes one or more of a power supply voltage and an operational clock frequency. Each of the operating modes includes a sleep mode where one or more blocks of logic in the processor are powered off, an idle mode where one or more blocks of logic have clock enable signals disabled, and one or more active modes, each with a different operating state. In various embodiments, when the power management unit 110 determines behavior of a given source of the sources 140 and 170 is changing, the power management unit 110 updates one or more sensor thresholds for the given source for changing a frequency of reporting one or more sensor values of the given source. The power management unit sends the updated one or more sensor thresholds to the given source.

In various embodiments, the computing system 100 is a system on a chip (SoC) that includes multiple types of integrated circuits on a single semiconductor die, each integrated circuit providing a separate functionality. In some embodiments, computing system 100 is also referred to as an application specific integrated circuit (ASIC), or an apparatus. In other embodiments, sources 140 and 170 are individual dies within a package such as a multi-chip module (MCM). In yet other embodiments, the sources 140 and 170 are individual dies or chips on a printed circuit board. Clock sources, such as phase lock loops (PLLs), interrupt controllers, and so forth are not shown in FIG. 1 for ease of illustration. It is also noted that the number of components of the computing system 100 vary from embodiment to embodiment. In other embodiments, there are more or fewer of each component than the number shown for the computing system 100. In various embodiments, the sources 140 and 170 are sources of sensor data that is provided to the power management unit 110.

In some designs, the sources 140 and 170 are one of an agent or an endpoint in the computing system 100. Examples of agents include one or more of multimedia engines, digital signal processors (DSPs) and processing units, each with one or more of a central processing unit (CPU) and a data parallel processor like a graphics processing unit (GPU). For example, the processor 142 includes one or more general-purpose cores of the CPU, one or more single instruction multiple data (SIMD) cores of the GPU and/or a field programmable gate array (FPGA), and so on. In an embodiment, when one or more of the sources 140 and 170 is an agent, the agent is a processor complex. The term "processor complex" is used to denote a configuration of one or more processor cores using local storage (not shown), such as a local shared cache memory subsystem, and capable of processing a workload together. For example, in an embodiment, the workload includes one or more programs comprising instructions executed by processor 142. Any instruction set architecture is implemented for the computing system 100 in various embodiments.

When one or more of the sources 140 and 170 are endpoints, examples of the sources 140 and 170 are input/output (I/O) peripheral devices such as memory devices, communication interfaces such as radio communication interfaces, speakers, displays, a camera, a memory controller and so on. In various designs, the sources 140 and 170 transfer messages, transactions and data with one another and with the power management unit 110. In some designs, the sources 140 and 170 also transfer messages, transactions and data to a memory (not shown). In various designs, the components of computing system 100 utilize one of a variety of types of a communication fabric (not shown) for the transferring of information such as messages, transactions and data.

In various designs, the power management unit 110 receives feedback information from the other components of the computing system 100. For example, the power management unit 110 receives measurements from one or more on-die temperature sensors, one or more on-die power supply sensors, one or more on-die current sensors, and one or more performance counters. The sensors 150 and 152 are representative of any of these types of sensors. Although only two sensors are shown in source 140, it is possible and contemplated that the source 140 uses any number of sensors. Although a description is provided for the components of the source 140, in some embodiments, the source 170 includes similar components as the source 140. In other embodiments, the number or type of components vary between the sources 140 and 170, but each utilizes sensors and communicates with the power management unit 110.

In some designs, one or more of the sensors 150 and 152 and the qualifying reporters 160 and 162 monitor or measure an indication of an activity level of the source 140. In some designs, the activity level is a measured parameter within a predetermined range. Alternatively, the sensors 150 and 152 and/or the qualifying reporters 160 and 162 determine a weighted sum of sampled signals. In various designs, one or more of clock enable signals routed to local clock distribution blocks, cache access hit/miss status lines, bus driver enable signals and so on are examples of signals chosen to be sampled. Besides on-die temperature, on-die current draw, on-die supply voltage, activity levels and weights sums of sampled signals, other examples of the sensor data are an average of a number of executed instructions per clock cycle, an average of a number of accesses of a particular data storage, a number of misses of a particular data storage, a measure of energy consumption such as an amount of Joules or a number of energy credits, a total number or a rate of a variety of other events, and so forth.

One or more of the sensors 150 and 152 and the qualifying reporters 160 and 162 determine averages and/or rates of statistics collected by the sensors 150 and 152. When one or more of the sensors 150 and 152 is a performance counter, in an embodiment, a count of a number of clock cycles since a previous sampling interval is maintained. Logic in one of the sensors 150 and 152 or the qualifying reporters determines the ratio of the count in the performance counter to the number of clock cycles. In addition to determining an average of values, one or more of the qualifying reporters 160 and 162 combine two or more values of the sensors 150 and 152 and a count of clock cycles to generate a result prior to comparing the result to a corresponding threshold stored in the configuration and status registers 164. In various designs, the configuration and status registers 164 store absolute thresholds corresponding to an absolute value of a given sensor of the sensors 150 and 152 or an absolute value of a result determined by using a given sensor of the sensors 150 and 152 in a formula. In some designs, the configuration and status registers 164 store relative thresholds corresponding to a change in the value of a given sensor of the sensors 150 and 152 or a change in a result determined by using a given sensor of the sensors 150 and 152 in a formula. In some embodiments, the configuration and status registers 164 store a set of thresholds for each one of multiple operating states, and a particular set is selected based on a current operating state of the source 140.

In addition to the above examples, a variety of other formulas and other ratios are also possible and contemplated to be used by the qualifying reporters 160 and 162. For example, in another embodiment, the filtering logic of the qualifying reporters 160 and 162 determines a rate of a number of cache misses in one or more levels of a cache memory hierarchy of the processor 142 before comparing the rate to a rate threshold stored in one of the programmable control and status registers 164. The type of data sampled or captured by the sensors 150 and 152 and qualified by the qualifying reporters 160 and 162 is often specific to the type of the processor 142 and the source 140. In an embodiment, the qualifying reporters 160 and 162 send one or more of sensor values and results to the power management unit 110 using a posted write transaction.

Each of the qualifying reporters 160 and 162 includes filtering logic for determining whether to send the sensor data measured by the sensors 150 and 152 or results determined from the sensor data to the power management unit 110. In an embodiment, the filtering logic in the qualifying reporters 160 and 162 compares a sensor value of a corresponding one of the sensors 150 and 152 to a threshold associated with the sensor. Again, in some cases, the thresholds are absolute thresholds, whereas, in other cases, the thresholds are relative thresholds. If the measured sensor value exceeds the threshold, then the filtering logic of the qualifying reporters 160 and 162 sends the sensor value to the power management unit 110. Again, in an embodiment, the qualifying reporters 160 and 162 send one or more of sensor values and results to the power management unit 110 using a posted write transaction to the power management unit, which uses less transactions than a non-posted read transaction from the power management unit. However, if the value of the sensor does not exceed the threshold, then the filtering logic of the qualifying reporters 160 and 162 prevents sending the value of the sensor to the power management unit 110. In various embodiments, the thresholds are stored in one of the programmable control and status registers 164.

In some embodiments, the filtering logic of the qualifying reporters 160 and 162 performs the comparisons during each sampling interval. In an embodiment, one or more of the sensors 150 and 152 sample data using different sampling intervals. Therefore, the filtering logic of the qualifying reporters 160 and 162 perform the comparisons using different sampling intervals. In another embodiment, the sensors 150 and 152 sample data using a same sampling interval and/or the filtering logic of the qualifying reporters 160 and 162 perform the comparisons using a same sampling interval. In yet other embodiments, the logic in the sources 140 and 170 sample data using a same sampling interval despite using different clock domains and operating clock frequencies. For example, in some designs, the sources 140 and 170 use a "global time synchronized sampling interval" where system sampling clock edges are aligned within a time threshold such as a few microseconds. The computing system 100 supports the global time synchronized sampling interval for cases when sensor data is aggregated across the system to update a control parameter.

In some embodiments, the global time synchronized sampling interval is one or more magnitudes slower than operating clock frequencies used by the processor 142. In such designs, the sampling clock edges are aligned within the time threshold between the sources 140 and 170 despite the sources 140 and 170 using different clock domains. In one example, the processor 142 uses an operating clock period in the range of nanoseconds, whereas the global time synchronized sampling interval has a period in the range of hundreds of microseconds. Therefore, one or more of the sensors 150 and 152 utilize multiple sampling intervals such as at least a default sampling interval and the global time synchronized sampling interval. In various embodiments, the global time synchronized sampling interval is stored in a programmable register of the control and status registers 164 similar to the default sampling interval.

Examples of the aggregated sensor data monitored by the sensors 150 and 152 are an amount of energy consumed and an amount of data transferred such as an amount of bandwidth. In some embodiments, one or more of the qualifying reporters 160 and 162 use filtering logic for comparing a sensor value sampled by one of the sensors 150 and 152 to an absolute threshold. For example, a given one of the qualifying reporters 160 and 162 compares an on-die temperature on a particular location of the processor 142 sampled by a given one of the sensors 150 and 152 to an absolute value of a temperature threshold such as 50 degrees Celsius.

In another embodiment, one or more of the qualifying reporters 160 and 162 use filtering logic for comparing a sensor value sampled by one of the sensors 150 and 152 to a relative threshold. For example, a given one of the qualifying reporters 160 and 162 determines a difference of an on-die temperature on a particular location of the processor 142 sampled by a given one of the sensors 150 and 152 to a previously sampled on-die temperature of the same location. Following this, the given one of the qualifying reporters 160 and 162 compares the difference to a relative temperature threshold such as an increase of 20 degrees Celsius and/or a decrease of 15 degrees Celsius.

In some embodiments, logic in the qualifying reporters 160 and 162 or logic in the interface 166 groups a qualified sensor value with any other sensor values qualified for reporting. In some embodiments, the sensors 150 and 152 use one or more sensor data sizes, each smaller than an amount of data transported in a packet from the interface 166 to the interface 136 of the power management unit 110. Examples of sensor data sizes are 8 bits, 32 bits and 64 bits. However, a variety of other sensor data sizes are possible and contemplated. In contrast, the interface 166 supports packet data payload sizes equivalent to the size of one or more supported cache line sizes. In one example, a supported cache line size is 64 bytes. For efficient transfer of qualified sensor values, the logic in the qualifying reporters 160 and 162 or the logic in the interface 166 groups multiple qualified sensor value together.

The logic in the interface 166 inserts the multiple qualified sensor values into a packet for transmission to the power management unit 110. In an embodiment, each of the sensor data sampled by the sensors 150 and 152 has a particular offset within the packet, so one or more indications are used to specify whether a particular sensor data is included in the packet. For example, one or more byte enables are asserted when the particular sensor data is included in the packet. In contrast, the one or more byte enables are negated when the particular sensor data is not included in the packet. In some embodiments, rather than use predetermined offsets, an identifier is stored in the packet to identify the type of the sensor data. In some designs, the identifiers are stored with the qualified sensor data in the packet. In other designs, the identifiers and corresponding sensor data sizes are stored elsewhere in the packet to be used later to determine where in the packet is a particular qualified sensor data located. In various designs, an identifier of the source 140 is already provided elsewhere in the packet.

Figure 2:
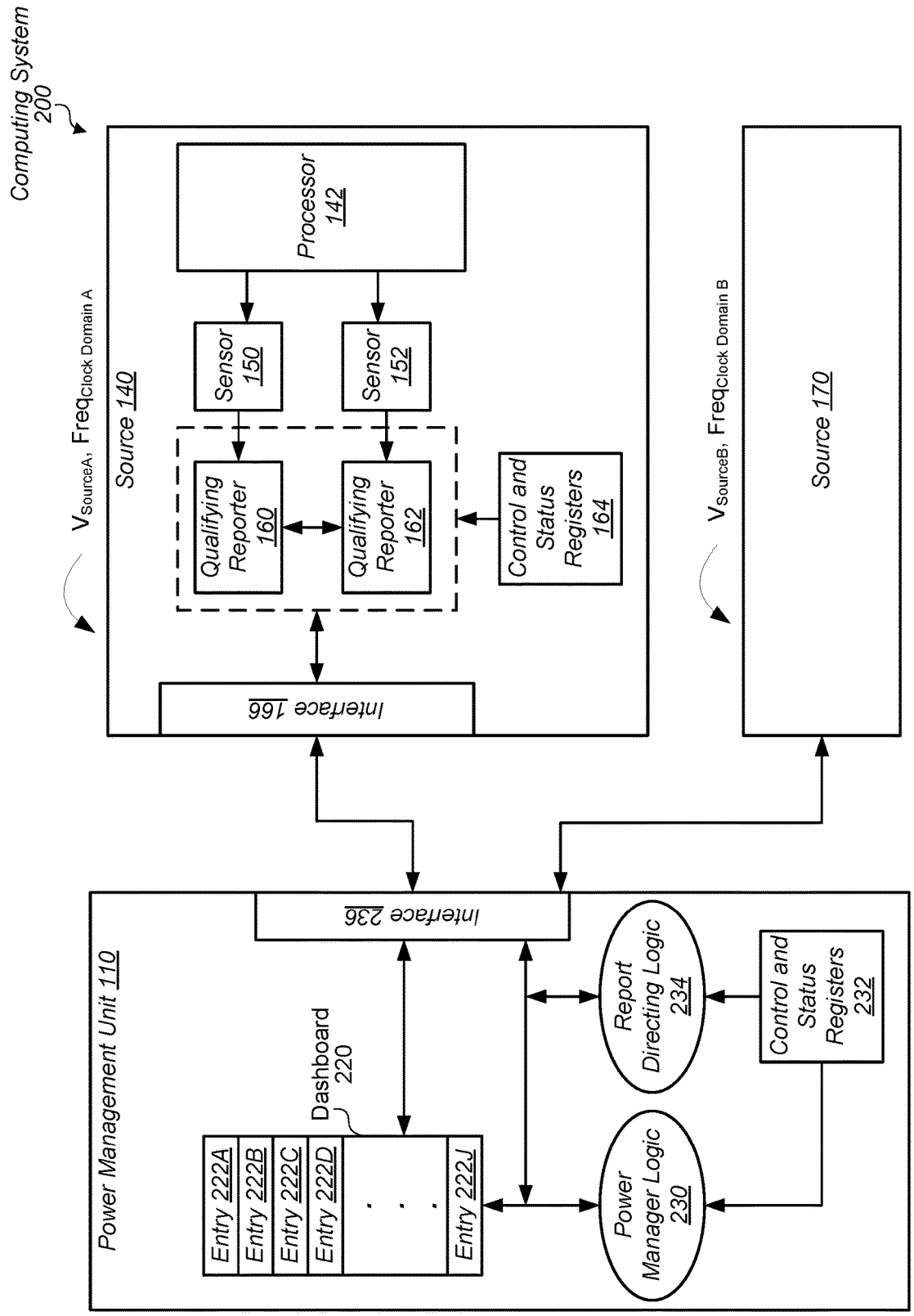
FIG. 2 is a block diagram of one embodiment of a computing system.

Turning now to FIG. 2, a generalized block diagram of one embodiment of a computing system 200 is shown. Circuitry and logic previously described are numbered identically. In the illustrated embodiment, the power management unit 110 transfers information between multiple components such as sources 140 and 170. The power management unit 110 receives sensor data via the interface 236 and stores the received sensor data in the data storage referred to as the dashboard 220. Each of the power manager logic 230 and the report directing logic 234 in the power management unit 110 is implemented by hardware and/or software. The power manager logic 230 processes sensor data read from the dashboard 220 based on parameters and ranges identified in the programmable control and status registers 232. Based on processing the sensor data stored in the dashboard 220, the power manager logic 230 updates one or more of operating modes and operating states of the sources 140 and 170.

In various embodiments, the power management unit 110 controls the supply voltage magnitudes for the sources 140 and 170 based on received and qualified sensor data. For example, in the illustrated embodiment, there is a supply voltage indicated as $V_{source}$ for each of the sources 140 and 170. In some embodiments, there may be multiple supply voltages for other components of the computing system 200 not shown. In some embodiments, based on indications received from the power management unit 110, logic local to the sources 140 and 170 control the operating modes and the operating states of the components, including power up and power down and various other operating states for those components, such as particular pipelines and other, that support more than one operating state and operating mode.

In various embodiments, each of the sources 140 and 170 is capable of operating with a different supply voltage from a different power plane (e.g., $V_{SourceA} \neq V_{SourceB}$). As shown, the source 140 uses the voltage magnitude $V_{SourceA}$ as an operational supply voltage and the clock frequency $Freq_{Clock\ Domain}$ A from a first clock domain. The source 170 uses the voltage magnitude $V_{SourceB}$ as an operational supply voltage and the clock frequency $Freq_{Clock\ Domain}$ B from a different, second clock domain. In other embodiments, each of the sources 140 and 170 operates with a same supply voltage (e.g., $V_{SourceA} = V_{SourceB}$) from a single power plane while also operating with different clock frequencies from different clock domains.

As shown, the power management unit 110 includes the dashboard 220 with entries 222A-222J. The dashboard 220 is implemented with one or more of registers, latches, random access memory (RAM) cells, and content addressable memory (CAM) cells. In one embodiment, the dashboard entries 222A-222J are assigned among the sources 140 and 170. In other embodiments, the dashboard entries 222A-222J are assigned among subcomponents of the sources 140 and 170. In various embodiments, the programmable control and status registers 232 store a given offset for each of the sources 140 and 170 and/or for one or more subcomponents of the sources 140 and 170. In such embodiments, one or more of the interface 236, the power manager logic 230, and the report directing logic 234 allocates particular entries of entries 222A-222J between two particular offsets in a fully associative manner.

In other embodiments, the given logic of one or more of the interface 236, the power manager logic 230, and the report directing logic 234 determines a combination of a start address corresponding to one of the sources 140 and 170 and the offset points to the identified dashboard entry of the entries 222A-222J. In some embodiments, the given logic does not store the identifiers of the sources 140 and 170 and/or subcomponents in the dashboard 220 since the location in the dashboard 220 indicates the source of the qualified sensor data. In other embodiments, the logic allocates entries 222A-222J in a first-in-first-out (FIFO) manner and stores an indication of the source of the qualified sensor data. In another embodiment, the given logic allocates the entries 222A-222J in a direct mapped manner. In yet other embodiments, the given logic allocates the entries 222A-222J using one of a variety of other manners.

In some embodiments, the interface 236 receives one or more qualified sensor values in a posted-write transaction. Rather than use non-posted read transactions sent by the power management unit 110, sensor data is collected through posted write transactions from the sources 140 and 170. When the power management unit 110 receives one or more qualified sensor values via the interface 236, in an embodiment, the power management unit 110 generates an indication of age. In one embodiment, the indication of age is a counter value with a reset value, and the age is updated each subsequent clock cycle. In some embodiments, the age is incremented each clock cycle. In other embodiments, the age is decremented each clock cycle. In yet other embodiments, logic in one of the interface 236, the power manager logic 230, and the report directing logic 234 captures or samples a local timestamp.

The power management unit 110 also identifies one of the sources 140 and 170 that sent the qualified sensor value. In one example, the logic analyzes a packet received by the interface 236, and based on an identifier stored in a particular location in the packet, determines which one of the sources 140 and 170 sent the packet. In addition, the logic in one of the interface 236, the power manager logic 230, and the report directing logic 234 selects one of the entries 222A-222J in the dashboard 220 based on the identified source. Following this, one of the interface 236, the power manager logic 230, and the report directing logic 234 allocates the selected entry of entries 222A-222J with the qualified sensor data and the indication of age such as a local timestamp or other.

In an embodiment, the control and status registers 232 store one or more timers for storing an age since sensor data has last been processed for a given one of the sources 140 and 170. In other embodiments, each of the entries 222A-222J store one or more ages corresponding to stored sensor data. In yet other embodiments, the power manager logic 230 maintains a priority for one or more of the sources 140 and 170 and/or subcomponents of the sources 140 and 170. In such embodiments, the control and status registers 232 store the priorities. In some embodiments, when the power manager logic 230 determines a time to process content stored in a given entry of the entries 222A-222J is reached, the power manager logic 230 discards the sensor value stored in the given entry, responsive to determining the stored local timestamp or other indication of age corresponding to the sensor value exceeds an age threshold. However, the power manager logic 230 updates one or more operating modes and operating states for the sources 140 and 170 based on the sensor value, responsive to determining the stored indication of age does not exceed the age threshold. In an embodiment, the programmable control and status registers 232 store the age threshold. In some embodiments, the programmable control and status registers 232 maintain multiple timestamp thresholds, such as age thresholds, for different types of sources and different types of sensor data. In other embodiments, the power manager logic 230 does not qualify updating one or more operating modes and operating states for the sources 140 and 170 based on an age threshold.

In various embodiments, when the report directing logic 234 determines behavior of a given source of the sources 140 and 170 is changing, the report directing logic 234 updates one or more sensor thresholds for the given source for changing a frequency of reporting one or more sensor values of the given source. The report directing logic 234 sends the updated one or more sensor thresholds to the given source. When the received sensor values indicate to the report directing logic 234 that behavior is changing frequently as measured by comparing received sensor values to one or more thresholds stored in the programmable configuration and status registers 236, in an embodiment, the report directing logic 234 updates one or more sensor thresholds for the given source to increase reporting of sensor data. In one embodiment, the report directing logic 234 sends to the given source one or more updated sensor thresholds with smaller values than corresponding one or more current sensor thresholds used in the given source for causing more frequent reporting of sensor values in the given source.

In contrast to the above, when the received sensor values indicate to the report directing logic 234 that behavior is changing infrequently as measured by comparing received sensor values to one or more thresholds stored in the programmable configuration and status registers 236, in an embodiment, the report directing logic 234 updates one or more sensor thresholds for the given source to decrease reporting of sensor data. In one embodiment, the report directing logic 234 sends to the given source one or more updated sensor thresholds with larger values than corresponding one or more current sensor thresholds used in the given source for causing less frequent reporting of sensor values in the given source. In some embodiments, the report directing logic 234 selects the initial thresholds and updated thresholds based on values stored in the programmable configuration and status registers 236. In an embodiment, these stored values are set based on simulations and executing benchmarks modeling a variety of selected workloads deemed appropriate for the targeted use of the computing system 200.

In one example, determining behavior of the given source is changing includes determining a duration between receiving a given sensor value and receiving a previous value of the given sensor value exceeds a duration threshold where this duration threshold is separate from the age threshold used for comparing to a dashboard entry age. In a second example, determining behavior of the given source is changing includes determining a change between the given sensor value and a previous value of the given sensor value exceeds a first change threshold. In an embodiment, the first change threshold is a maximum change threshold. For these two cases, in an embodiment, the report directing logic 234 sends to the given source one or more updated sensor thresholds with smaller values than corresponding one or more current sensor thresholds used in the given source for causing more frequent reporting of sensor values in the given source.

In a third example, determining behavior of the given source is changing includes determining a change between the given sensor value and a previous value of the given sensor value is less than a second change threshold. In an embodiment, the second change threshold is a minimum change threshold. For this case, in an embodiment, the report directing logic 234 sends to the given source one or more updated sensor thresholds with larger values than corresponding one or more current sensor thresholds used in the given source for causing less frequent reporting of sensor values in the given source.

Referring now to FIG. 3, one embodiment of a dashboard entry 300 is shown. Each dashboard entry 300 of a dashboard in the power management unit stores one or more sensor values. When new sensor values are reported, logic in the power management unit updates a dashboard entry such as the dashboard entry 300. In an embodiment, the dashboard entry 300 is representative of each separate entry of the dashboard. As shown, the dashboard entry 300 includes several fields.

Although the fields 302-316B are shown in this particular order, other combinations are possible and other or additional fields may be utilized as well. The bits storing information for the fields 302-316B may or may not be contiguous. A source identifier (ID) field 302 identifies a given source of multiple sources capable of reporting sensor data. In some embodiments, the position of the dashboard entry 300 identifies the given source and the dashboard entry does not use the source identifier (ID) field 302. A source thermal limit field 304 stores a limit for the given source in terms of thermal credits, an estimated activity level, an on-die temperature, an on-die current measurement, or other. In some embodiments, the dashboard entry 300 stores multiple limits. In other embodiments, one or more of programmable configuration and status registers and tables store the limits, so the dashboard entry 300 does not use the source thermal limit field 304.

Figure 5:
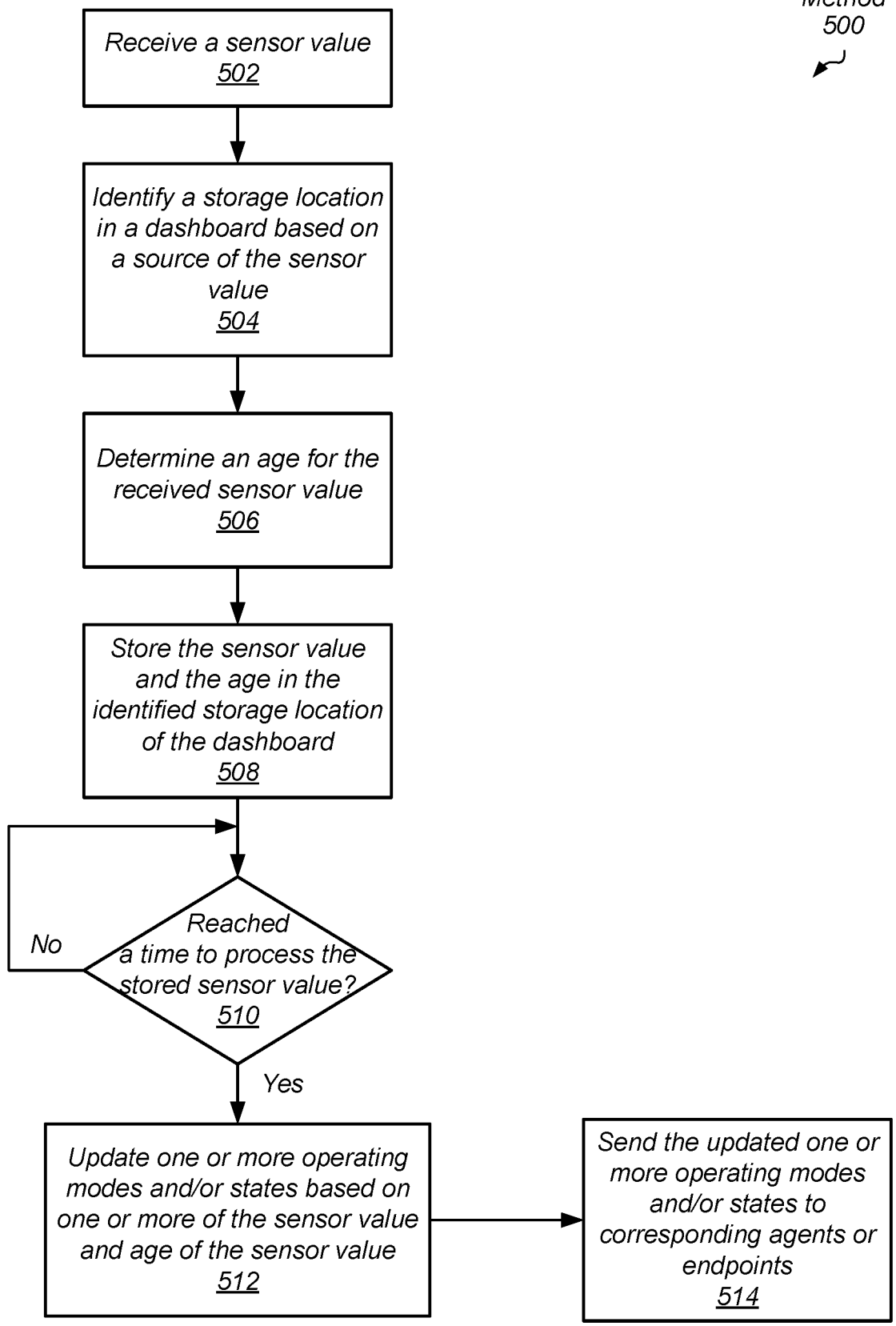
FIG. 5 is a flow diagram of one embodiment of a method for efficiently reporting sensor data of multiple processing units.

The sensor identifier (ID) field 310A identifies a particular sensor of the given source. As described earlier, examples of sensors are on-die temperature sensors, on-die power supply sensors, on-die current sensors, and performance counters. The sensor entry status field 312A stores metadata corresponding to the given sensor identified by the sensor identifier field 310A. In an embodiment, the metadata includes a valid bit and an indication of whether logic has accessed the corresponding sensor value. The timestamp field 314A stores a local timestamp captured when logic updated the dashboard entry 300 with sensor data as shown in FIG. 5. In another embodiment, the field 314A stores an age value that is updated each clock cycle. The sensor value field 316A stores the received sensor value from the given source. In some embodiments, the dashboard entry 300 stores multiple sensor values from the same given source. For example, the fields 310B-316B store the same types of information as the fields 310A-316A, but for another sensor of the given source.

Figure 4:
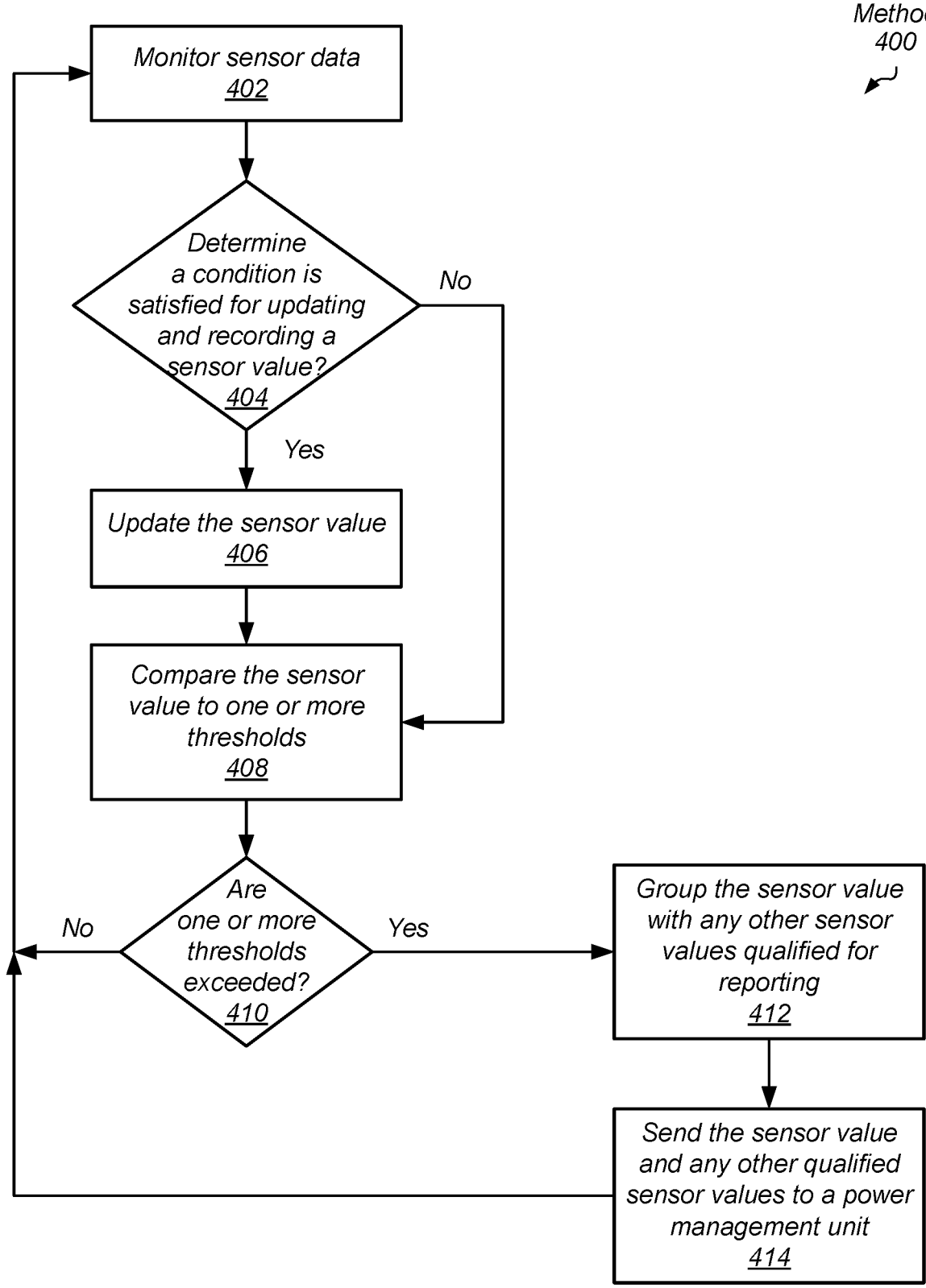
FIG. 4 is a flow diagram of one embodiment of a method for efficiently reporting sensor data of multiple processing units.

Turning now to FIG. 4, a generalized flow diagram of one embodiment of a method 400 for efficiently reporting sensor data of multiple processing units is shown. For purposes of discussion, the steps in this embodiment (as well as for FIGS. 5-6) are shown in sequential order. However, in other embodiments some steps may occur in a different order than shown, some steps may be performed concurrently, some steps may be combined with other steps, and some steps may be absent. Each of the computing systems 100, 200 and 700 may implement one or more of the steps of the methods 400-600 (of FIGS. 4-6).

Logic in a source that generates sensor data processes instructions of one or more software applications. As described earlier, in various designs, the source is one of an agent or an endpoint in a computing system. The source operates in one of multiple operating modes. The operating modes include a sleep mode where one or more blocks of logic are powered off, an idle mode where one or more blocks of logic have clock enable signals disabled, and one or more active modes, each with a different operating state. The source includes one or more sensors. As described earlier, examples of sensors are on-die temperature sensors, on-die power supply sensors, on-die current sensors, and performance counters. While the source operates in one of the multiple operating modes, the sensors monitor sensor data (block 402). Examples of the sensor data are on-die temperature, on-die supply voltage, on-die current draw, an average of a number of executed instructions per clock cycle, an average of a number of accesses of a particular data storage, a number of misses of a particular data storage, a number of energy consumption credits, a total number or a rate of a variety of other events, and so forth. The sensor data is often specific to the type of the functional block generating the sensor data.

The source uses one or more conditions for updating and recording sensor data. In various designs, logic in the source captures, or otherwise samples or stores, one or more sensor values during each sample interval. In an embodiment, the duration of the sample interval is stored in a programmable configuration and status register. In one embodiment, the logic uses multiple sampling intervals. In some designs, the logic uses at least a default sampling interval and a global time synchronized sampling interval as described earlier for the sensors 150 and 152 (of FIG. 1). In some designs, the logic uses other qualifying factors in addition to the sample interval such as detecting an active operating mode. Other qualifying factors are possible and contemplated. If the logic determines a condition is satisfied for updating the sensor value ("yes" branch of the conditional block 404), then the logic updates the sensor value (block 406). In addition, the logic captures the sensor value such as updating a register or other sequential element or data storage used for recording sensor data.

The logic compares the sampled sensor value to one or more thresholds (block 408). In some designs, the logic stores one or more thresholds in programmable configuration and status registers. To reduce the frequency of reporting sensor values, in one embodiment, the logic increases one or more thresholds stored in the programmable configuration and status registers. In some embodiments, to increase the frequency of reporting sensor values, the logic decreases one or more thresholds stored in the programmable configuration and status registers. In an embodiment, the logic sets one or more thresholds to zero in order to increase the rate of reporting sensor values. If logic determines a condition is not satisfied for updating the sensor value ("no" branch of the conditional block 404), then control flow of method 400 moves to block 408 where the logic compares the sensor value to one or more thresholds such as thresholds stored in the programmable configuration and status registers. In some designs, control flow of method 400 returns to block 402 where the logic monitors sensor data, rather than move to block 408. The design choice depends on the frequency of updating the threshold values in the programmable configuration and status registers.

If the logic determines no thresholds are exceeded ("no" branch of the conditional block 410), then control flow of method 400 returns to conditional block 402 where the logic monitors sensor data. If the logic determines one or more thresholds are exceeded ("yes" branch of the conditional block 410), then the logic groups the sensor value with any other sensor values qualified for reporting (block 412). As described earlier, in an embodiment, the logic packs multiple sensor data into a packet for transmission. Following this, the logic sends the sensor value and any other qualified sensor values to a power management unit (block 414).

Referring to FIG. 5, a generalized flow diagram of one embodiment of a method 500 for efficiently reporting sensor data of multiple sources is shown. Logic in a power management unit generates and sends one or more updated operating states and operating modes to processing units in a computing system. The processing units are agents or endpoints in the computing system. The processing units are also sources of sensor data. To determine the operating states and the operating modes of the functional blocks within a source, logic implemented by hardware and/or software in the power management unit uses the sensor data from the processing units. The logic in the power management unit receives a sensor value (block 502).

In some embodiments, the power management unit receives one or more qualified sensor values in a posted-write transaction from a source. Rather than use non-posted read transactions sent by the power management unit 110, sensor data is collected through posted write transactions from the sources. The use of non-posted read transactions creates two transactions to route through an interconnect or a communication fabric between the power management unit and a given source. In contrast, the use of a posted write transaction creates a single transaction to route through the interconnect or the communication fabric between the power management unit and the given source.

The logic in the power management unit identifies a storage location in a dashboard based on a source of the sensor value (block 504). The dashboard is data storage implemented with one or more of registers, latches, random access memory (RAM) cells, and content addressable memory (CAM) cells. In one embodiment, the dashboard entries are assigned among multiple sources. For example, the logic determines a particular offset based on the source. In other embodiments, the logic identifies the storage location in the dashboard based on other criteria and storage arrangements as described earlier for logic 230 and dashboard 220 (of FIG. 2).

In an embodiment, the logic determines an age of the received sensor value (block 506). In some embodiments, the logic begins updating an age for the sensor value such as updating an age counter each clock cycle. The age counter is stored in the dashboard entry, a table, a programmable configuration and status register, or other. In other embodiments, the logic captures, or otherwise samples, a copy of a timestamp counter. In one embodiment, the logic stores the sensor value and the indication of age in the identified storage location of the dashboard (block 508). When a timestamp is used, rather than an updating age, the logic of the power management unit ensures that the sensor value and the timestamp are stored in the dashboard simultaneously such as in the same clock cycle. Otherwise, if an interrupt occurs between storing the sensor value and the timestamp, the stored timestamp no longer corresponds to the sensor value. In an embodiment, the logic uses an atomic load pair operation to read each of the sensor value and the timestamp together before writing the values into the dashboard entry.

If the logic determines a time to process the stored sensor value is not reached ("no" branch of the conditional block 510), then control flow of method 500 remains at conditional block 510. The logic in the power management unit uses an age, a priority scheme using a variety of criteria, a timestamp, and so on to determine when to process a particular sensor value stored in the dashboard. If the logic determines a time to process the stored sensor value is reached ("yes" branch of the conditional block 510), then the logic updates one or more operating modes and/or operating states based on the sensor value (block 512). In some embodiments, the updates are also based on the age of the sensor value. In one example, a scaling factor is used to scale the amount of an update based on the combination of the sensor value and the age of the sensor value. For example, in an embodiment, a younger sensor value causes a larger update than a sensor value with a same value but older age. Following this, the logic sends the updated one or more operating modes and/or states to corresponding agents or endpoints (block 514). In some embodiments, the logic compares an indication of age of the sensor value to a threshold. In an embodiment, if the logic determines the indication of age has exceeded the threshold, then the logic discards the sensor value. For example, the power management unit has not yet received a more recent sensor value to overwrite the current sensor value in an identified dashboard entry, and the corresponding age of the current sensor value exceeds the age threshold. In some embodiments, the logic uses an age, rather than a timestamp, to determine whether the sensor value has "aged out."

In an embodiment, when the logic determines the time to process the stored sensor value is reached, the logic compares an indication of age of the sensor value to the threshold, and if the indication of age has not exceeded the threshold, then the logic determines the sensor value has not "aged out." Accordingly, the logic updates one or more operating modes and/or operating states based on the sensor value. In other embodiments, the logic does not use comparisons to an age thresholds and performs the steps described above for blocks 510-514.

Figure 6:
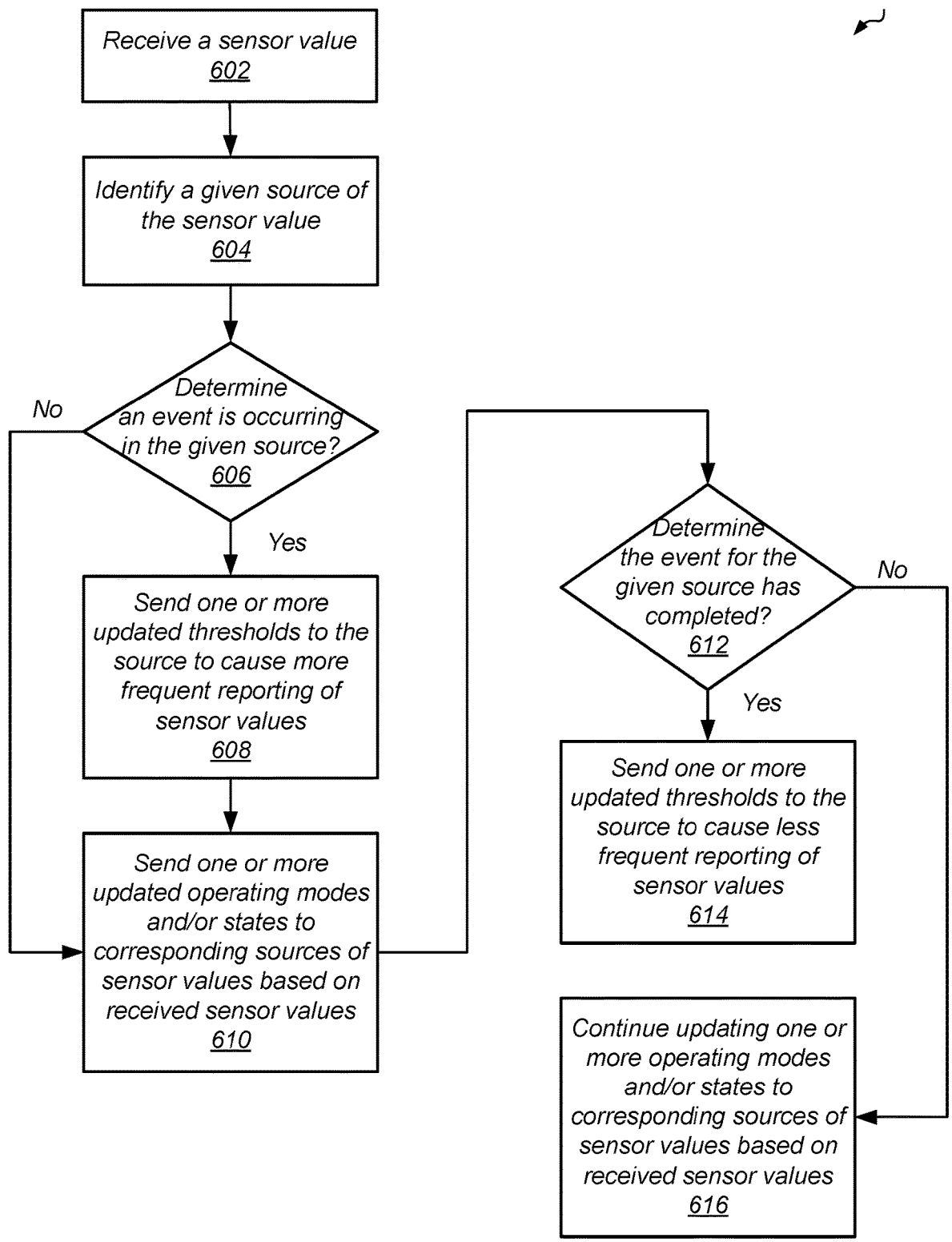
FIG. 6 is a flow diagram of one embodiment of a method for efficiently reporting sensor data of multiple processing units.

Referring to FIG. 6, a generalized flow diagram of one embodiment of a method 600 for efficiently reporting sensor data of multiple processing units is shown. Logic in a power management unit generates and sends one or more updated operating states and operating modes to sources of sensor data in a computing system. The logic receives a sensor value (block 602). The logic identifies a given source of the sensor value (block 604).

If the logic determines an event is occurring in the given source ("yes" branch of the conditional block 606), then the logic sends one or more updated thresholds to the source to cause more frequent reporting of sensor values (block 608). Determining an event is occurring in the given source may be equivalent to determining behavior of the given source is changing as measured by comparing received sensor values to one or more thresholds stored in the programmable configuration and status registers. In one example, determining behavior of the given source is changing includes determining a duration between receiving a given sensor value and receiving a previous value of the given sensor value exceeds a duration threshold where this duration threshold is separate from the age threshold used for comparing to a dashboard entry age. In a second example, determining behavior of the given source is changing includes determining a change between the given sensor value and a previous value of the given sensor value exceeds a first change threshold. In an embodiment, the first change threshold is a maximum change threshold.

In another example, if the given source has become idle despite an operating mode indicating otherwise, then the given source probably has not sent sensor data for a duration longer than a threshold. The failed expectation indicates an event. In addition, another example, the filtering logic in qualifying reporters of the given source has not determined that sensor data exceeded corresponding thresholds. However, now, when the given source transitioned to an active mode or an active mode with a higher performance operating state or to a same active mode, but the workload has recently increased, the given source has begun sending sensor data that its filtering logic in qualifying reporters has found to exceed corresponding thresholds. In response to detecting these conditions based on comparisons of received sensor data and indications of age with thresholds, the logic in the power management unit sends lower thresholds to the given source to continue to receive sensor data from the given source or for causing more frequent reporting of sensor values. For example, in many cases, the algorithms used by the logic in the power management unit rely on periodic updates of the sensor data to update the operating modes and operating states. To maintain efficiency and ease-of-use of these algorithms, the logic in the power management unit lowers the sensor data thresholds in order to maintain periodic updates of the sensor data from the given source.

The logic sends one or more updated operating modes and/or states to corresponding sources of sensor values based on received sensor values (block 610). If the logic determines the event for the given source has completed ("yes" branch of the conditional block 612), then the logic sends one or more updated thresholds to the source to cause less frequent reporting of sensor values (block 614). For example, if the given source has been active, then the given source probably has sent sensor data regularly such as with the frequency corresponding to a given sample interval. The filtering logic in qualifying reporters of the given source has determined that sensor data exceeded corresponding thresholds. If the logic in the power management unit has determined no changes in reported sensor data exceed change thresholds for a particular duration, then the logic sends higher thresholds to the given source to cause less frequent reporting of sensor data. In various designs, programmable configuration and status registers store thresholds corresponding to the change in sensor data and the duration of no detected changes. If the logic determines the event for the given source has not completed ("no" branch of the conditional block 612), then the logic continues updating one or more operating modes and/or states to corresponding sources of sensor values based on received sensor values (block 616).

Figure 7:
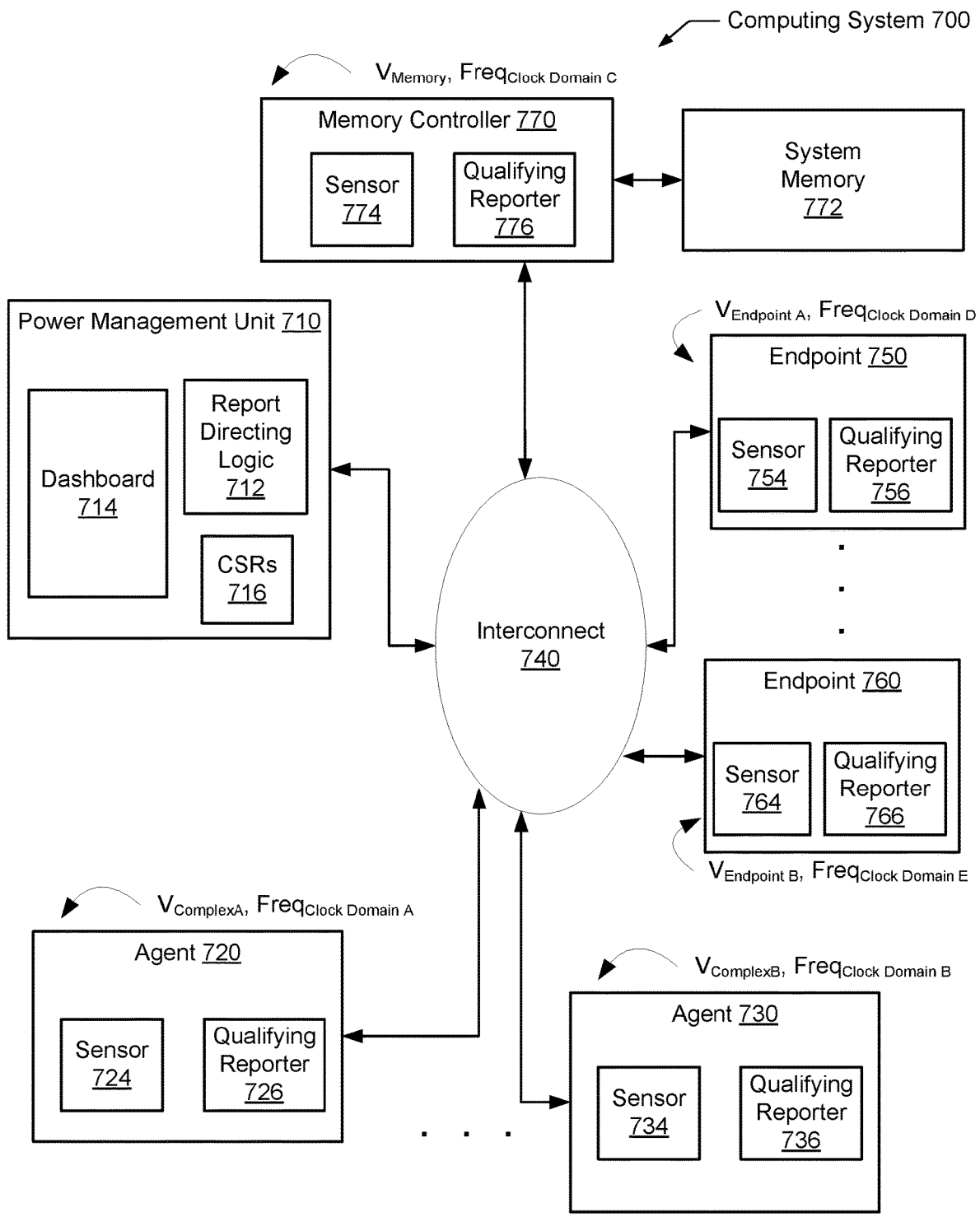
FIG. 7 is a block diagram of one embodiment of a computing system.

Referring to FIG. 7, a generalized block diagram of one embodiment of a computing system 700 is shown. In the illustrated embodiment, the interconnect 740 routes messages, transactions and data among the power management unit 710, agents 720-730, endpoints 740-750 and memory controller 770. In some embodiments, the interconnect 740 is a communication fabric (or fabric). Similar to the computing systems 100 and 200, in various embodiments, the computing system 700 is a system on a chip (SoC) that includes multiple types of integrated circuits on a single semiconductor die, each integrated circuit providing a separate functionality. In some embodiments, computing system 700 is also referred to as an application specific integrated circuit (ASIC), or an apparatus. In other embodiments, the agents 720-730 and endpoints 750-760 are individual dies within a package such as a multi-chip module (MCM). In yet other embodiments, the agents 720-730, endpoints 750-760, the power management unit 710 and the memory controller 770 are individual dies or chips on a printed circuit board.

Clock sources, such as phase lock loops (PLLs), interrupt controllers, and so forth are not shown in FIG. 7 for ease of illustration. It is also noted that the number of components of the computing system 700 vary from embodiment to embodiment. In other embodiments, there are more or fewer of each component than the number shown for the computing system 700. Similar to sources 140 and 170 (of FIG. 1), in an embodiment, each of the agents 720-730 is a processor complex. In some embodiments, components within agent 720 are similar to components in agent 730. In other embodiments, components in agent 720 are designed for lower power consumption, and therefore, include control logic and processing capability producing less performance. In such embodiments, supported clock frequencies are less than supported clock frequencies in agent 710. In addition, one or more of the processor cores in agent 720 include a smaller number of execution pipelines and/or functional blocks for processing relatively high power consuming instructions than what is supported by the processor cores in agent 710.

In various embodiments, agents 720-730 and endpoints 750-760 transfer commands and data to one another and to the power management unit 710 and the memory controller 770 through the interconnect 740. In some embodiments, the interconnect 740 includes multiple levels of fabric multiplexers (or muxes). In such embodiments, agents 720-730, endpoints 750-760, the power management unit 710 and the memory controller 770 include fabric interface units. Different types of messages, transactions and data flow independently through the fabric. In some embodiments, a communication fabric utilizes a single physical fabric bus to include a number of overlaying virtual channels, or dedicated source and destination buffers, each carrying a different type of traffic. Each channel is independently flow controlled with no dependence between transactions in different channels. In other embodiments, the communication fabric is packet-based, and may be hierarchical with bridges, cross bar, point-to-point, or other interconnects.

In various embodiments, the interconnect 740 uses one or more bus protocols for transferring commands and data, enforcing an order between transactions with particular transaction types, and ensuring cache coherence among the different agents 720-730, endpoints 750-760 and the memory controller 770. The supported communication protocols determine allowable transfer sizes, supported burst transfer sizes, supported directions for simultaneous transfers, allowable number of outstanding requests while sending more requests, support of out-of-order completions, supported clock domains, supported interrupt mechanisms, and so forth.

Endpoints 750-760 are representative of any number and type of components coupled to interconnect 730. For example, in some embodiments, endpoints 750-760 include one or more cameras, flash controllers, display controllers, media controllers, graphics units, communication interfaces such as radio communication interfaces, and/or other devices. Endpoints 750-760 are also representative of any number of input/output (I/O) interfaces or devices and provide interfaces to any type of peripheral device implementing any hardware functionality included in computing system 700. For example, in an embodiment, any of the endpoints 750-760 connect to audio peripherals such as microphones, speakers, interfaces to microphones and speakers, audio processors, digital signal processors, mixers, etc. Other I/O devices include interface controllers for various interfaces external to computing system 700, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices include networking peripherals such as media access controllers (MACs).

In yet other embodiments, one or more of endpoints 750-760 include memory controllers for interfacing with system memory or separate memory such as a portable flash memory device. As shown, memory controller 770 is used to interface with system memory 772. Memory controller 770 includes any number of memory ports, generates proper clocking to memory devices, and interfaces to system memory 772. System memory 772 includes one or more of dynamic random access memory (DRAM) such as synchronous DRAM (SDRAM) (including mobile versions of the SDRAMs such as mDDR3, etc., and/or low power versions of the SDRAMs such as LPDDR4, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

In various embodiments, one or more of agents 720-730, endpoints 750-760, and the memory controller 770 use a sensor and filtering logic such as a qualifying reporter. For example, the agent 720 uses the sensor 724 and the qualifying reporter 726. Similarly, the agent 730 uses the sensor 734 and the qualifying reporter 736. Endpoints 750-760 use sensors 754-764 and qualifying reporters 756-766 while the memory controller 770 uses the sensor 774 and the qualifying reporter 776. Although a single sensor and corresponding qualifying reporter is shown in each of the agents 720-730, endpoints 740-750 and memory controller 770, another number of sensors and qualifying reporters are possible and contemplated. Configuration and status registers used for storing thresholds are not shown for ease of illustration. In various embodiments, the functionality of the sensors 724-774 and the qualifying reporters 726-776 is equivalent to the sensors 150-152 and the qualifying reporters 160-162 (of FIG. 1).

In various embodiments, the power management unit 710 controls the supply voltage magnitudes and operational clock frequencies for the agents 720-730, endpoints 740-750 and memory controller 770 based on received and qualified sensor data. The power management unit 710 includes the dashboard 714, report directing logic 712 and control and status registers (CSRs) 716, which have the equivalent functionality of the dashboard 220, the report directing logic 234, and the control and status registers (CSRs) 232 (of FIG. 2). Although not shown, in various embodiments, the power management unit 710 also includes power manager logic with functionality equivalent to the functionality of the power manager logic 230 (of FIG. 2).

In the illustrated embodiment, there is a supply voltage indicated as $V_{Complex}$ for each of the agents 720-730, a supply voltage indicated as $V_{Endpoint}$ for each of the endpoints 740-750, and a supply voltage indicated as $V_{Memory}$ for the memory controller 770. In addition, there is a clock frequency $Freq_{Clock\ Domain}$ from a particular clock domain for each of the agents 720-730, endpoints 740-750 and memory controller 770. In some embodiments, there may be multiple supply voltages for other components of the computing system 700 not shown. In various embodiments, each of the agents 720-730, endpoints 740-750 and memory controller 770 is capable of operating with a different supply voltage from a different power plane. In other embodiments, one or more of the agents 720-730, endpoints 740-750 and memory controller 770 operate with a same supply voltage from a single power plane while also operating with different clock frequencies from different clock domains.

In some embodiments, the sensors 724-774 sample data using a same sampling interval and/or the filtering logic of the qualifying reporters 726-776 perform the comparisons using a same sampling interval. Similar to the computing system 100, in yet other embodiments, the logic in the agents 720-730, the endpoints 750-760 and the memory controller 770 sample data using a same sampling interval despite using different clock domains and operating clock frequencies. For example, in some designs, the agents 720-730, the endpoints 750-760 and the memory controller 770 use a "global time synchronized sampling interval" where system sampling clock edges are aligned within a time threshold such as a few microseconds. The computing system 700 supports the global time synchronized sampling interval for cases when sensor data is aggregated across the system to update a control parameter. Examples of the aggregated sensor data are an amount of energy consumed and an amount of data transferred such as an amount of bandwidth.

Figure 8:
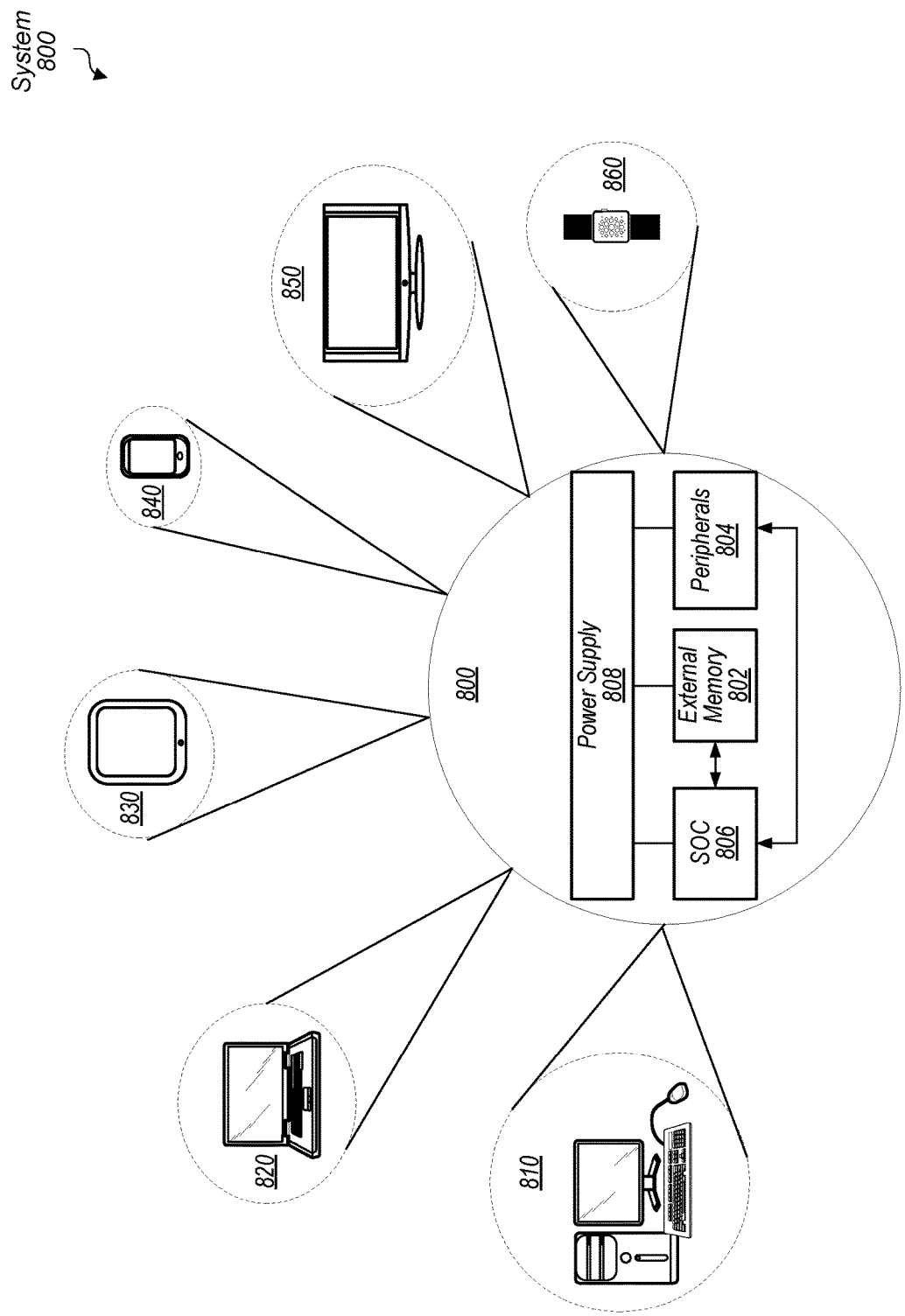
FIG. 8 is a block diagram of one embodiment of a system.

Turning next to FIG. 8, a block diagram of one embodiment of a system 800 is shown. As shown, system 800 represents chip, circuitry, components, etc., of a desktop computer 810, laptop computer 820, tablet computer 830, cell or mobile phone 840, television 850 (or set top box coupled to a television), wrist watch or other wearable item 860, or otherwise. Other devices are possible and are contemplated. In the illustrated embodiment, the system 800 includes at least one instance of a system on chip (SoC) 806 which includes multiple processors and a communication fabric. In some embodiments, the SoC 806 includes a computing system such as computing system 100 (of FIG. 1), computing system 200 (of FIG. 2) and computing system 700 (of FIG. 7). In various embodiments, SoC 806 is coupled to external memory 802, peripherals 804, and power supply 808.

The power supply 808 provides the supply voltages to SoC 806 as well as one or more supply voltages to the memory 802 and/or the peripherals 804. In various embodiments, power supply 808 represents a battery (e.g., a rechargeable battery in a smart phone, laptop or tablet computer). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid-state storage, or disk storage. The peripherals 804 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A power management unit comprising:
    a dashboard comprising a plurality of entries configured to store sensor data corresponding to a source of sensor data; and
    report directing logic comprising circuitry;
    wherein in response to receiving a given sensor value from the source, the report directing logic is configured to:
        store the given sensor value and an indication of an age of the given sensor value in an identified entry of the dashboard; and
        convey a sensor threshold value to the source, in response to determining a behavior of the source is changing, where the sensor threshold value is associated with a frequency at which the source reports sensor data.

2. The power management unit as recited in claim 1, wherein determining the behavior of the source is changing comprises determining a duration of time exceeds a duration threshold, wherein the duration of time is an amount of time elapsed between receipt of the given sensor value by the power management unit and receipt of a previous value of the given sensor value by the power management unit.

3. The power management unit as recited in claim 1, wherein the report directing logic is further configured to send to the source one or more updated sensor thresholds with smaller values than corresponding one or more sensor thresholds currently in the source.

4. The power management unit as recited in claim 1, wherein determining the behavior of the source is changing further comprises determining a difference between the given sensor value and a previous sensor value from the source exceeds a threshold.

5. The power management unit as recited in claim 1, wherein determining the behavior of the source is changing comprises determining a difference between the given sensor value and a previous sensor value from the source is less than a threshold.

6. The power management unit as recited in claim 1, wherein the report directing logic is further configured to send to the source one or more updated sensor thresholds with larger values than corresponding one or more sensor thresholds currently in the source.

7. The power management unit as recited in claim 1, further comprising power manager logic configured to:
  determine a time to process content stored in the identified entry; and
  discard the given sensor value, in response to determining an indication of age of the given sensor value exceeds an age threshold.

8. The power management unit as recited in claim 7, wherein the power manager logic is further configured to update one or more operating modes and operating states based on the given sensor value, responsive to:
  determining the stored indication of age of the given sensor value does not exceed an age threshold; and
  determining the time to process content stored in the identified entry has elapsed.

9. The power management unit as recited in claim 1, wherein the report directing logic is further configured to receive the given sensor value by receiving a posted write transaction.

10. A method, comprising:
  communicating, by report directing logic comprising circuitry in a power management unit, with a plurality of sources of sensor data;
  wherein in response to receiving, by the report directing logic, a given sensor value from a source of the plurality of sources:
    storing, by the report directing logic, the given sensor value and an indication of an age of the given sensor value in an identified entry of a dashboard; and
    in response to determining from the given sensor value that an event is occurring in the source:
      updating, by the report directing logic, one or more operating modes and operating states of the plurality of sources based on the given sensor value and the age of the given sensor value; and
      conveying, by the report directing logic, the one or more updated operating modes and operating states to the plurality of sources.

11. The method as recited in claim 10, further comprising scaling an amount of updates for the one or more operating modes and operating states based on the age of the given sensor value.

12. The method as recited in claim 11, wherein scaling the amount of updates comprises using larger updates for the one or more operating modes and operating states when the age of the given sensor value is young compared to updates used when the age of the given sensor value is old.

13. The method as recited in claim 10, further comprising conveying a sensor threshold value to the source to cause less frequent reporting of at least the given sensor value responsive to determining the event has completed.

14. The method as recited in claim 13, wherein determining the event has completed comprises determining no changes in the given sensor value from the source for a duration of time exceeding a duration threshold, wherein the duration of time is an amount of time elapsed between receipt of the given sensor value by the power management unit and receipt of a previous value of the given sensor value by the power management unit.

15. The method as recited in claim 10, further comprising determining a time to process content stored in the identified entry based on priorities of the plurality of sources.

16. A system comprising:
  a source of sensor data; and
  a power management unit;
  wherein in response to receiving a given sensor value from the source, the power management unit is configured to:
    store the given sensor value and an indication of an age of the given sensor value in an identified entry of a dashboard; and
    convey a sensor threshold value to the source, in response to determining a behavior of the source is changing, where the sensor threshold value is associated with a frequency at which the source reports sensor data.

17. The system as recited in claim 16, wherein determining the behavior of the given source is changing comprises determining a duration of time exceeds a duration threshold, wherein the duration of time is an amount of time elapsed between receipt of the given sensor value by the power management unit and receipt of a previous value of the given sensor by the power management unit.

18. The system as recited in claim 16, wherein determining the behavior of the source is changing comprises determining a difference between the given sensor value and a previous value of the given sensor value exceeds a threshold.

19. The system as recited in claim 16, wherein determining the behavior of the source is changing comprises determining a difference between the given sensor value and a previous sensor value from the source is less than a threshold.

20. The system as recited in claim 19, wherein the power management unit is further configured to send to the source one or more updated sensor thresholds with larger values than corresponding one or more sensor thresholds currently in the source.

* * * * *